United States Patent [19]

Trahan et al.

[11] 4,272,273
[45] Jun. 9, 1981

[54] PLUNGER MECHANISM FOR GLASSWARE FORMING MACHINE

[75] Inventors: Albert J. Trahan, Vernon; Bruce R. Beckwith, Unionville; David B. Murray, West Hartford, all of Conn.

[73] Assignee: Emhart Industries, Inc., Farmington, Conn.

[21] Appl. No.: 60,769

[22] Filed: Jul. 26, 1979

[51] Int. Cl.³ .......................... C03B 9/26; C03B 11/12
[52] U.S. Cl. ........................................ 65/167; 65/232; 65/319; 65/323
[58] Field of Search ................. 65/167, 232, 319, 321, 65/323

[56] References Cited
U.S. PATENT DOCUMENTS

| | | | |
|---|---|---|---|
| 2,755,597 | 7/1956 | Rowe | 65/167 |
| 3,190,188 | 6/1965 | Donnelly | 65/323 X |
| 3,314,775 | 4/1967 | Shetler et al. | 65/319 X |
| 3,323,891 | 6/1967 | Donnelly | 65/321 X |
| 3,595,637 | 7/1971 | Eldred et al. | 65/323 X |

Primary Examiner—Arthur D. Kellogg
Attorney, Agent, or Firm—McCormick, Paulding & Huber

[57] ABSTRACT

A glassware forming machine has a blank mold station at which two parisons are formed in mating blank molds and neck molds, the parisons being formed inverted by upwardly moving plungers entering the lower open ends of the parison cavities. A twin plunger mechanism especially suitable for double gob pressing of parisons has the capability for ready removal and replacement of the plunger mechanism for producing glassware on different mold centers. A floating bottom plate is provided on a vertically adjustable foot structure, and the twin plunger mechanism includes upper and lower housing portions readily secured to the bottom plate by locating studs which position the plunger mechanism in the glassware forming machine frame and in accurately indexed relationship to the centerline of the parison cavities at the blank mold station. Cooling air is provided to the plunger through a cooling tube mounted in the lower portion of the plunger mechanism, and this tube is free to move laterally to accomodate slight misalignment between it and the centerline of the plunger.

7 Claims, 4 Drawing Figures

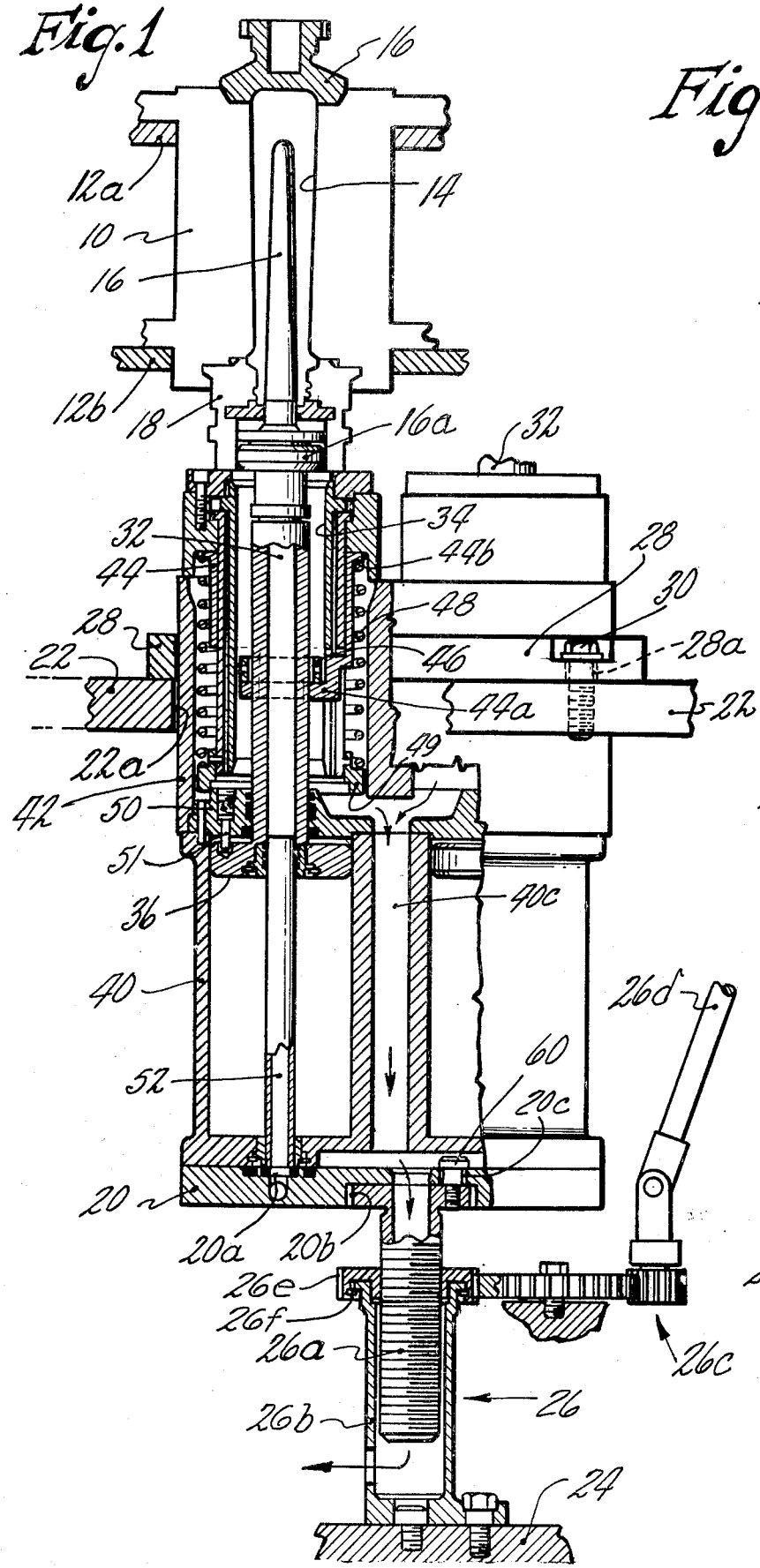
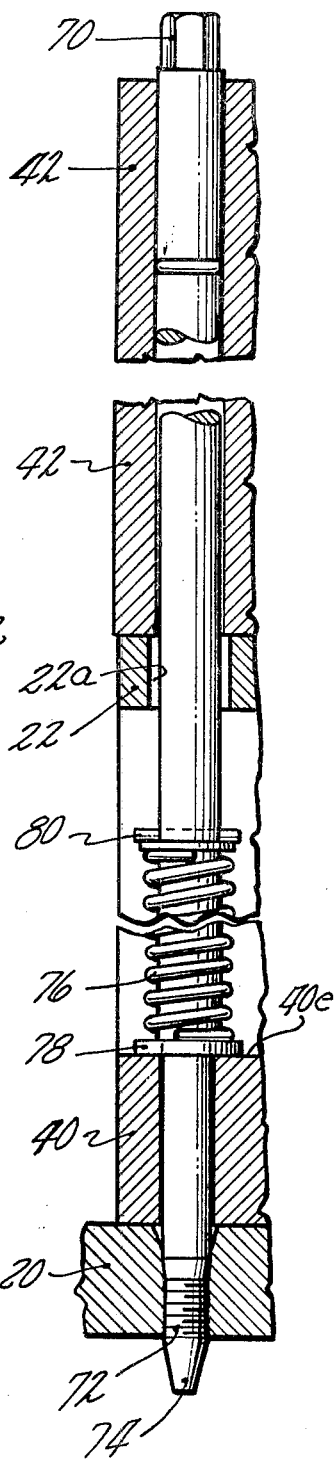

the
PLUNGER MECHANISM FOR GLASSWARE FORMING MACHINE

BACKGROUND OF THE INVENTION

The art of manufacturing glass containers by the so called press and blow method in a Hartford I.S. machine is well known. In accordance with this method glass gobs or charges are fed from a source into an upwardly open blank mold, which blank mold may comprise two molds in a typical double gob operation, and each of which blank molds are subsequently closed at the top by a baffle. Pressing plungers then move upwardly into the blank molds to force the molten glass gob into each blank mold, and into the associated neck ring mold, after which the plunger is withdrawn and the blank mold and the baffle removed, so that the neck ring mold can invert the parison from the blank to a blow mold station in a typical Hartford I.S. glassware forming machine. The glass gob or charge is supported by the upper end of the plunger during loading, and once the baffle has been moved into place the gob or charge is then pressed by upward movement of the plunger within the blank mold to form the glass by molding contact with the internal walls of the inverted blank mold. A portion of the glass charge is displaced downwardly into molding contact with the walls of the neck ring mold, and its associated thimble. The plunger is then retracted after the pressing stroke, to a level below that at which the plunger first contacts the glass charge, in order to allow clearance for movement of the neck ring mold, and the associated parison, in a curved path to an adjacent blow mold station at which the parison is further formed in a final blowing step.

In double gob operation pursuant to this pressing of the parison, plunger mechanisms of different types must occasionally be removed and replaced when glassware articles of different size and shape are to be formed. That is, the center distances may vary, or a pressing plunger mechanism may have to be replaced with a blow and blow plunger mechanism.

The present invention has as its primary object an improved floating plunger mechanism wherein a bottom or base plate is provided on a vertically adjustable jack screw, which bottom plate not only provides a convenient manifold for connecting the fluid operated components of the plunger mechanism to the valve block and timing drum characteristic of the I.S. machine, but the bottom or base plate also includes a flat upper surface, without protrusions, for convenience in assemblying the plunger mechanism therewith. The bottom or base plate is also floating, in that it is capable of horizontal movement to accommodate slight horizontal movement of the plunger mechanism as required in order to align the vertically movable plungers with their associated blank molds. Further, the plunger cooling tube is also free to float slightly in the plunger mechanism itself.

SUMMARY OF THE INVENTION

This invention relates generally to the blank mold station of a glassware forming machine of the I.S. type, and deals more particularly with an improved floating plunger mechanism which permits the twin plungers in a typical double gob set-up to be readily removed for replacement or repair as for example to convert the machine from press and blow to blow and blow, or to change over from one job to another with a minimum of downtime for that particular machine section.

The plunger mechanism itself includes side-by-side cylindrical piston chambers, and annular plunger pistons slidably received in these chambers, said pistons having upwardly extending hollow actuator portions to which the plungers are adapted to be threadably secured. These cylindrical chambers are defined in a lower portion of the housing and an upper casing is secured to the lower casing so as to provide a convenient receptacle for the springs and sleeves conventionally associated with guiding and positioning the plunger itself during its vertical motion. The annular piston and actuating rod assembly is telescopically received on a cooling tube, the lower end of which tube is uniquely secured with limited floating capability in the lower end of the cylindrical piston chamber for that particular plunger. The lower end of the said tube has a bushing which fits loosely in and which communicates with a recessed portion of a bottom plate, and no locating plugs or the like are required on the bottom plate in order to define the passageway for the plunger cooling air and for other fluid supplies as required to operate the plunger mechanism. The bottom plate is horizontally movable with respect to the vertically adjustable jack screw assembly on which it is supported, and elongated locking studs are provided to anchor the upper casing to the bottom plate without necessity for securing the plunger assembly directly to the frame of the machine by such locking studs. Thus, the plunger mechanism itself can be bench tested, and inserted in the I.S. machine at the blank mold station through a positioning ring or plate which is secured to the top of the section box of the I.S. machine frame.

BRIEF DESCRIPTION OF THE DRAWINGS

FIG. 1 is a vertical elevational view with portions broken away to reveal in vertical section certain internal portions of the plunger mechanism associated with one blank mold and neck ring mold, the other blank and neck ring molds in the double gob installation shown being deleted for clarity.

FIG. 4 is a vertical sectional view of one of two locking studs, shown in plan view in FIG. 3, with portions of the studs being broken away, and with these stud portions illustrated to a larger scale than that of the other views.

DETAILED DESCRIPTION OF PREFERRED EMBODIMENTS

Figure 2:
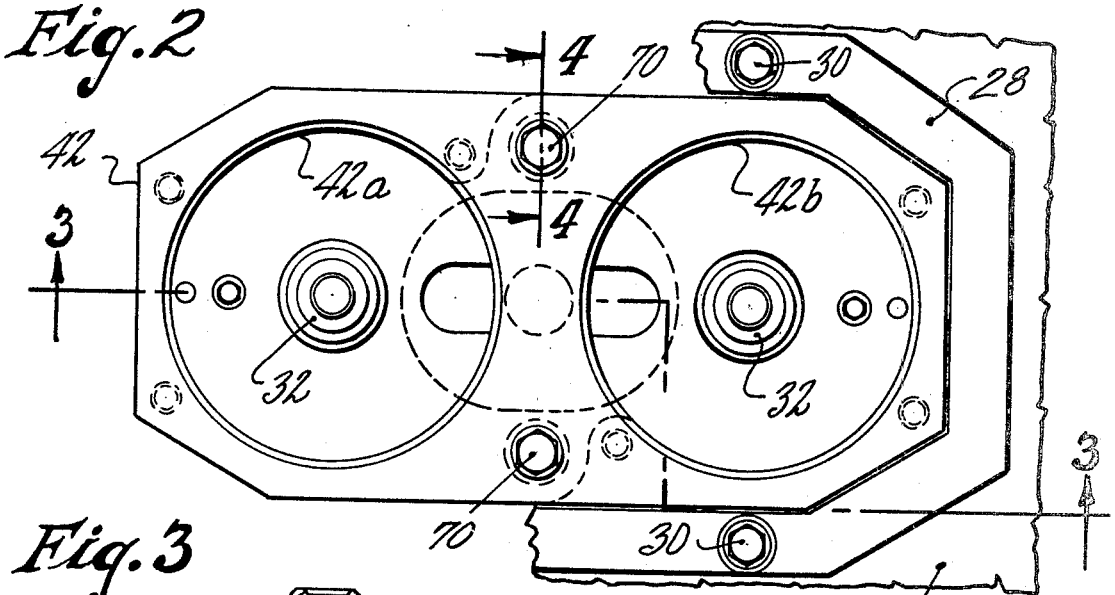
FIG. 2 is a plan view of the apparatus shown in FIG. 1, being more particularly a plan view of FIG. 3.

Turning now to the drawings in greater detail, FIG. 1 shows a parison pressing plunger mechanism for forming one of two gobs at a double gob blank mold station in a typical Hartford I.S. type glassware forming machine.

The typical glassware forming machine includes an inverted blank mold, such as shown at 10, mounted on suitable mold holder arms, 12a and 12b, such that the split blank mold can be opened and closed in timed relationship with other components of the glassware forming machine, particularly those components at the individual section for which the mechanism of FIG. 1 is intended to be used. A typical blank mold station in such a glassware forming machine section includes two such blank molds and it will be understood from the description to follow that the present invention is particularly well suited to double gob parison forming, and that FIG. 1 shows in pertinent part a twin plunger assembly suitable for double gob operations. The blank mold 10 defines a parison molding cavity 14 which includes a top opening having a baffle 16 adapted to close such opening after the mold charge has been deposited in the blank mold. A funnel (not shown) is typically used prior to the baffle 16 moving into the position shown in FIG. 1, and such a funnel aids in deposit of the glass gob in the blank mold. The plunger 16 then moves upwardly to the position shown in forming of the gob into the parison shape by the cavity defined between the mold surface 14 and the plunger 16. The parison is formed inverted and the blank mold mates with a neck ring mold, as indicated generally at 18, for purposes of forming these parisons. The neck mold is typically mounted on, and carried by, invert arms (not shown) such that the parisons (one shown) can be transferred from the blank mold station shown in FIG. 1, to a blow mold station (not shown) where the parison is final formed in upright position in a typical Hartford I.S. type glassware forming machine.

It will be apparent that the plunger 16 must move vertically in order to form the glass gob as described above, and so that the parison can be transferred from the position shown at the blank station to the blow station of such a machine. The mechanism for so moving the plunger 16 requires air for its operation from the valve block of a conventional glassware forming machine, and it is a feature of the present invention that the air lines for providing such air to the plunger mechanism will be connected to the plunger mechanism through a bottom plate 20 to be described in greater detail below.

The conventional Hartford I.S. type glassware forming machine includes a fixed frame which has a top 22, sometimes referred to as the top of the machine section box, as well as a bottom of this section box, indicated generally at 24. These members 22 and 24 comprise a fixed frame of the glassware forming machine and it will be apparent to the reader that the blank mold 10 is movable to and from the position shown in FIG. 1 and must mate with the neck ring mold 18 each time that a parison or parisons are formed at the blank mold station. Thus, the plunger mechanism to be described must be installed in the machine at the proper height for achieving the desired stroke for the pressing plunger 16, and also at the desired horizontal location in order that the plunger 16 be properly aligned with the axis of the parison cavity in which the parison will be formed. The present invention seeks to provide a plunger mechanism which is not only readily adjustable vertically, and which is not only selectively connectable to the desire sources of air for operation of and cooling of, the various components comprising a typical plunger mechanism, but the plunger mechanism of the present invention further includes a unique floating bottom plate 20 which will permit the machine operator to install the plunger mechanism in accurately aligned relationship to the associated parison or blank mold cavities defined by the blank mold 10 and neck ring mold 18.

This alignment requirement is accomplished in the double gob configuration shown by virtue of a plunger mechanism having plural plungers reciprocably contained therein, which plunger mechanism loosely received in an opening 22a of the I.S. machine frame, and is mounted on a base plate 20 capable of horizontal floating movement on a vertically adjustable foot structure 26 to be described. A positioning plate or ring 28 is provided around the upper portion of the twin plunger mechanism shown, and is also adapted to be attached to the top of the section box or I.S. machine frame 22 for initial adjusting movement. Screws 30, 30 are employed for this attachment, and enlarged openings 28a, 28a in the plate 28 permit limited horizontal floating movement of the plunger mechanism in the I.S. machine.

Turning now to a detailed description of the twin plunger mechanism itself, each plunger 10 is secured to the upper end of a hollow actuating piston rod 32, and the plunger preferably includes an enlarged shoulder or guide portion 16a which permits the plunger to be slidably received in the neck ring mold 18, and this plunger guide portion 16a is also adapted to be slidably received in a plunger guiding sleeve 34 such that the plunger 10 and its actuating rod 32 can be moved from the raised position shown to a lowered position wherein the piston 36 will have moved the plunger from the FIG. 1 position to a lowered position by conventional internal air connections, preferably made through the bottom plate 20, and extending upwardly through the side walls of the lower cylinder portion 40 of the plunger mechanism. Means is provided within an upper casing portion 42 of the plunger mechanism for limiting the plunger movement at an intermediate position, suitable for loading a glass gob in the blank mold prior to the parison forming operation, and conventional positioning and guiding elements are provided for this purpose within the open upper end of the casing 42 for this purpose. These conventional plunger guiding and positioning elements will be described only briefly herein.

The reader is referred to Rowe U.S. Pat. No. 2,755,597 for a more detailed description of the plunger positioning and guiding elements normally provided within the upper holder portion of a plunger mechanism. Briefly, a vertically shiftable sleeve 44 fits slidably in the upwardly open cavity defined by the casing 42, and the sleeve 44 has at least one radially inwardly extending arm portion 44a, which arm portion is slidably received in a vertically elongated slot in the above mentioned plunger guide sleeve 34 such that spacer 46, encircling the actuating rod 32, will cause the movable sleeve 44 to define an intermediate position for the plunger between the position shown and the lowered position of the piston 36 referred to above which intermediate position is suitable for loading a charge or gob in the blank mold 10 when the baffle 16 has been moved aside, and prior to forming of the gob into the parison shape shown in FIG. 1. The force of compression spring 48 acting between the flange 44b on shifting sleeve 44, and a fixed ring 49 at the lower end of the holder portion of the casing means 42, may be overcome by increasing the downward force of the air on the upper surface of the piston 36. This will provide a full down position for the plunger suitable for providing clearance to move the parison blank to the blow mold station of a typical Hartford I.S. machine after the split blank mold 10 separated following the parison forming step and the parison is transferred to the blow station.

Figure 3:
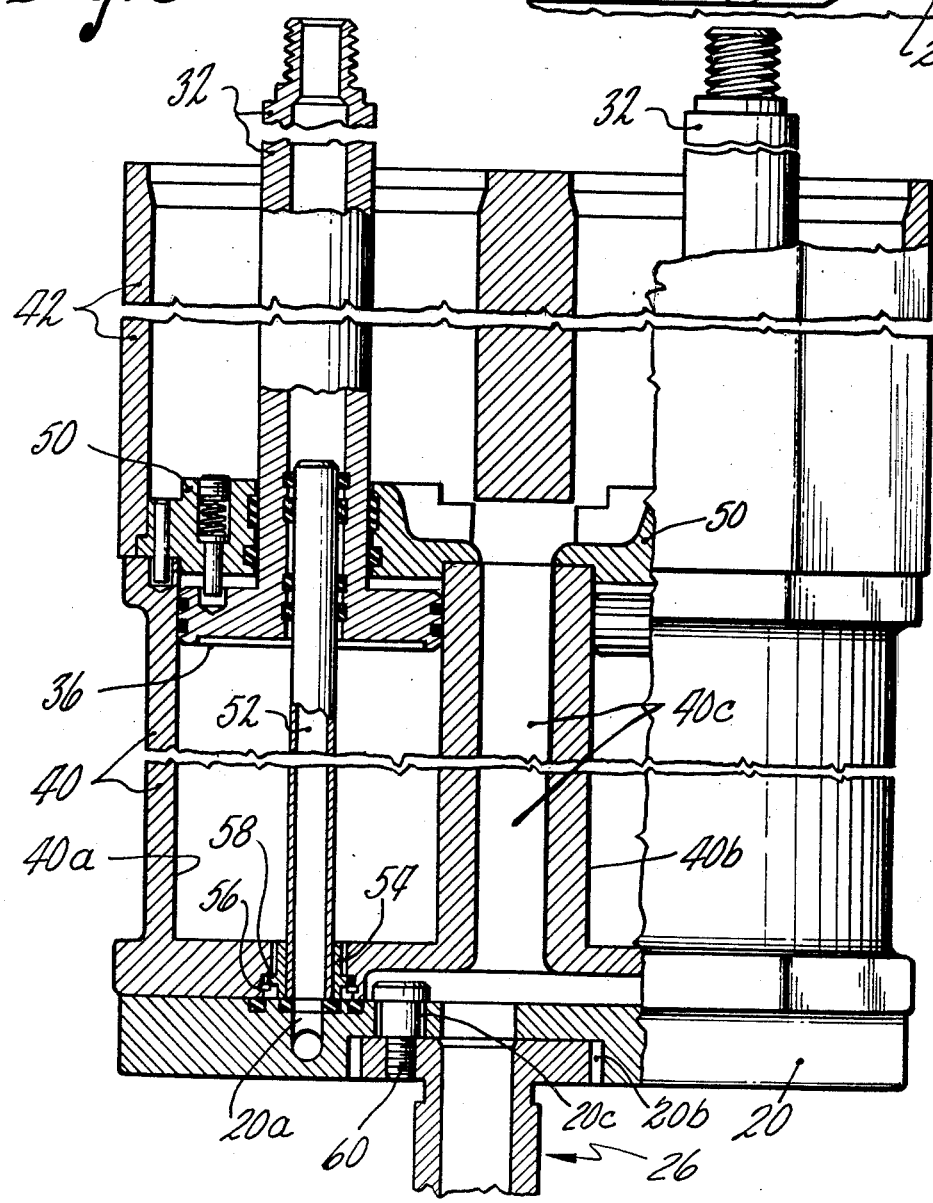
FIG. 3 is a sectional view taken on line 3—3 of FIG. 2, which views (FIG. 2 and FIG. 3) have the blank mold and neck ring mold deleted, and with the plunger guiding and positioning components of the parison pressing plunger mechanism also deleted.

In the twin plunger press and blow set-up illustrated in the drawings two such plungers, and associated positioning and guiding elements, will be provided in the unitary structure shown, and although only one such plunger and associated positioning and guiding element is illustrated in FIG. 1 it will be apparent that the second plunger and associated positioning and guiding elements will comprise substantially a mirror image of those illustrated in FIG. 1. The housing for these twin plunger mechanisms comprises the upper casing means 42 defining twin upwardly open cavities for receiving the plunger positioning and guiding elements, and FIG. 2 illustrates this casing means 42 and its associated upwardly open cavities 42a and 42b for receiving the plunger and associated positioning and guiding elements. The plunger piston actuating rod 32 is also illustrated in FIG. 2, and FIG. 3 shows these rods as having an upper threaded portion for threadably receiving the plungers. Still with reference to FIG. 2, the upper casing 42 is preferably cast in one piece with through opening defining these cavities 42a and 42b and it is another feature of the present invention that this casting is reversible, that is the casing means 42 can be assembled in the I.S. machine either in the position shown, or in a position 180° with respect thereto. Thus, the casing means 42 is symmetrical about a vertical centerline taken through FIG. 2. Finally, and still with reference to FIG. 2, the plunger mechanism is adapted to be secured in the top of a section box, or I.S. machine frame 22, by means of the top ring or positioning plate 28 mentioned previously.

The casting defining the casing means 42 is preferably formed with two through openings for defining the upwardly open cavities 42a and 42b which receive the conventional plunger positioning and guiding elements. In order to close the lower end of these openings, cylinder heads 50, 50 are secured in the lower end of these through openings and each head 50 defines a central opening which is suitably sealed by means for slidably receiving the plunger piston actuating rod 32. The lower piston portion 36 is integrally connected to the actuating rod 32 and also defines a central opening for slidably receiving a cooling tube 52.

Lower plunger cylinder means 40 cooperates with the cylinder heads 50, 50 and said cylinder means 40 is also preferably cast in one piece so as to be reversible during assembly. This lower cylinder means 40 defines twin cylinder chambers for slidably receiving the pistons 36, 36 so that these pistons move with respect to the chambers 40a and 40b and with respect to the cooling tubes 52 provided in the lower end of the cylinder chambers. Thus, the plunger pistons and actuating rods are telescopically received on the fixed cooling tubes, and the cooling tube lower ends are uniquely secured in the generally flat lower end portions of the cylinders so that they, and the entire plunger assembly can be jointly and independently moved horizontally with respect to the base plate 20 until the entire assembly has been suitably aligned as described above.

The base plate 20 has upwardly open ports such as shown at 20a in FIG. 3, which ports are defined in planar portions of its upper surface, and which ports communicate with the lower ends of the cooling tubes 52 without the need for upwardly projecting bushings or the like characteristic or prior art base configurations. The base plate 20 provides a convenient manifold for connecting fluid or air supply lines to the plunger actuating mechanism itself, particularly the plunger piston 36, and these connections are also made through the base plate 20, but it is a feature of the present invention that such connections are made through the generally planar upper surface of the base plate 20 and the lower generally flat surface of the cylinder means 40. One such connection is shown by way of illustration for the cooling tube 52, and its associated port 20a in the base plate 20. It will be apparent that other connections of a similar type can be used for the air pressure and exhaust lines associated with movement of the piston 36.

The cooling tube 52 is not rigidly secured to the lower end wall of the piston chamber, but as shown best in FIG. 3, this tube has a bushing 54 secured to the lower end of tube 52, and a snap ring 56 is provided in a groove in the piston chamber end wall to act on an outwardly projecting flange 58 on the bushing to hold the tube in place axially. The hole in the cylinder chamber end wall for this bushing 54 is slightly larger than the outside diameter of the bushing itself to allow some float for the cooling tube 52. This float permits slight misalignment between the plunger piston rod 32 and the axis or centerline of the plunger mechanism itself, and avoids the binding characteristic of prior art plunger mechanisms equipped with plunger cooling through fixed telescoping tubes and piston rods.

Cooling air for the plunger is provided to the cooling tube 52 and is adapted to move upwardly through the hollow interior of the annular piston rod 32 into the plunger 16, and is exhausted from the plunger to the space between the actuating rod 32 and the sleeve 34 which guides the plunger. This exhaust air travels downwardly through the interior of the lower cylinder means 40 through an internal passageway 40c and then through an opening located centrally of the base plate 20 and thence through the hollow jack screw 26a comprising a part of the vertically adjustable foot mechanism 26. The fixed portion 26b of the adjustable foot mechanism 26 is secured to the bottom of the section box or to the I.S. machine frame 24 as shown in FIG. 1. Vertical adjustment of the base plate 20 is achieved through a conventional gearing system, as indicated generally at 26c, with an upwardly extending adjustment rod 26d being rotatable from above the top of the section box in accordance with conventional practice.

The base plate 20 is not only adjustable vertically by means of the adjustable foot mechanism described above, but this base plate 20 is also capable of horizontal floating movement on the upper pedestal portion of the jack screw 26a as a result of the fact that the base plate 20 has a downwardly open recess 20b somewhat larger in diameter than the diameter of the upper head or pedestal portion of the jack screw 26a. One or more screws 60 is provided for securing the base plate 20 to the jack screw 26a, and the enlarged opening or recess 20b provided for the upper head portion of the jack screw allows for the horizontal floating motion discussed above. This screw 60 preferably has a shoulder to prevent its being tightened so that it will not interfere with the slight horizontal floating movement of the base plate with respect to the jack screw 26a after the plunger mechanism has been placed on the base plate. FIG. 4 shows a locking stud which is preferably secured in place (in two positions intermediate the twin plungers) as the last step in the assembly process, and these locking studs will now be described in detail.

With particular reference to FIGS. 2 and 4, a pair of locking studs 70, 70 extend downwardly through aligned opening in the upper casing means 42 and the lower cylinder means 40 such that lower threaded end portions 72 of these locking studs 70 can be threadably received in threaded openings provided for this purpose in the base plate 20. The lower end of the locking stud 70 is tapered as shown at 74 in FIG. 4, and each locking stud 70 is spring loaded in the lower cylinder means 40 so as to be urged from the position shown in FIG. 4 to a raised position wherein the stud lower portion 74 projects only slightly below the lower surface of the cylinder means 40 in order to aid in the assembly of the plunger mechanism with the base plate at the blank mold station of the I.S. machine. Spring 76 acts between a washer 78 loosely received on the stud 70 and engaging a surface 40e on the cylinder means 40 and a pin 80 fixed in the stud 70 at the position shown in FIG. 4 in order to provide this convenience for the machine operator, that is to provide a plunger mechanism with a generally flat lower surface adapted to cooperate with the generally flat upperwardly facing surface of the base plate so as to aid in the assembly of these components and to thereby reduce downtime of the I.S. machine, or I.S. machine section, in changing over from forming one type or size of ware to another.

The tapered lower ends of the locking studs 70, 70 are spring biased upwardly to positions wherein these tapered ends project only slightly below the precisely machined lower surface of lower cylinder means 40. This configuration serves to protect this surface while the plunger mechanism is being assembled on a workbench or the like prior to installation in the I.S. machine as described above.

A spring loaded plunger 51 is provided in the cylinder head 50 for insertion in an opening on the top of piston 36 at least when the latter is in the raised position shown in FIG. 1. This configuration provides convenient means to prevent rotation of the piston during removal or replacement of the threaded plunger 16 from the top of actuating rod 32.

Finally, the vertically adjustable jack screw assembly 26 includes gearing 26c which includes a gear 26e mounted on top of the fixed foot 26b by a snap ring 26f. This construction prevents this gear 26e from riding up on the jack screw 26a as the screw is rotated by the device 26d to adjust the height of the base plate 20.

We claim:

1. In a glassware forming machine having a frame and a blank mold station at which mating blank mold and neck ring mold assemblies cooperate to define at least one parison cavity, said cavity having a plunger opening for receiving a reciprocable plunger, the improvement comprising a plunger mechanism to be mounted in the machine frame so that the plunger registers with the plunger opening, a base plate for said plunger mechanism, means supporting said base plate in the machine frame for limited horizontal floating movement with respect to the machine frame, said base plate supporting means including a fixed foot and a vertically movable member adjustably connected to said foot for achieving said vertical movement and also connected to said base plate for said floating movement, said plunger mechanism including lower plunger cylinder means with a flat bottom surface abutting said base plate and a plunger cooling tube provided centrally of a cylindrical piston chamber defined by said cylinder means, an annular plunger piston including an actuator rod extending upwardly from said annular piston, said rod being of annular cross section and telescopically receiving said cooling tube at its lower end and adapted to support said plunger at its upper end, said plunger mechanism including upper casing means secured to said lower cylinder means and defining a generally cylindrical cavity above said plunger piston chamber, plunger positioning and guiding elements in said casing cavity, said casing means fitting loosely in an opening provided for it in the machine frame, a positioning plate snugly received around said casing, fastener means for releasably securing said positioning plate to the machine frame, and at least one locking stud securing said casing means to said base plate independently of said positioning plate, said base plate having at least one upwardly open port defined in a planar portion of its upper surface, which port communicates with the lower end of said cooling tube, and the lower end of said tube not projecting below said flat bottom surfaces of said cylinder means.

2. The combination defined by claim 1 wherein two locking studs have threaded lower ends adapted to threadably engage openings in said base plate, and means biasing said studs upwardly so that they are biased toward positions wherein they project slightly below said flat bottom surfaces of said cylinder means when the plunger mechanism is removed from its assembled position on the base plate.

3. The combination defined by claim 2 wherein at least two plungers are provided symmetrically in said casing means, and said lower cylinder means includes two cylinder heads for each of two piston chambers, each cylinder head having a central bore to slidably receive two of said plunger actuator rods, and means mounted in each said cylinder head to prevent rotation of said annular piston in its associated piston chamber at least when the piston has moved to the upper limit position, said plunger being adapted for threadable connection with the upper end of said actuator rod when in said upper limit position.

4. The combination defined by claim 3 wherein said plural plunger cooling tubes have lower ends mounted to end walls of said plunger piston chamber so as to float horizontally therein, each said tube having a flange adjacent its lower end, and a snap ring in a groove defined by said piston chamber end wall to lock said tube against axial movement, each said tube lower end fitting loosely in an opening defined by said piston chamber end wall to allow for said horizontal float.

5. The combination defined by claim 1 wherein said fastener means for securing said positioning plate to the machine frame includes openings oversize with respect to said fastener means for allowing limited adjusting movement of said plunger mechanism casing with respect to the machine frame.

6. The combination of claim 1 wherein said plunger mechanism cooperates with a plural cavity blank mold station, and wherein plural plungers are provided in said casing means with plural plunger pistons in plural cylinder chambers of said cylinder means.

7. The combination of claim 6 wherein twin plungers are provided in symmetrical relationship to one another in a single opening of the I.S. machine frame, said positioning plate encircling said casing means and said base plate cooperating with the lower flat ends of both plunger piston chambers.

* * * * *